Figure 1:
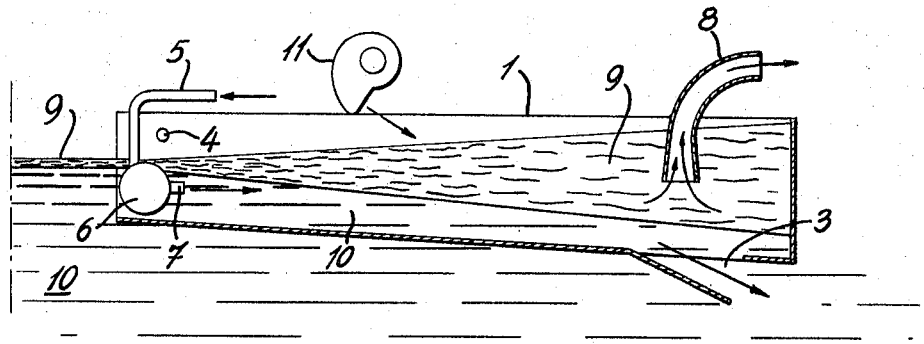

United States Patent [19]

Chastan-Bagnis

[11] 3,847,815

[45] Nov. 12, 1974

[54] SCOOP FOR COLLECTING A LAYER OF POLLUTING MATERIAL ON WATER SURFACES

[76] Inventor: Lucien Chastan-Bagnis, 21 Avenue Isola Bella, 06400 Cannes, France

[22] Filed: Jan. 31, 1973

[21] Appl. No.: 328,310

[30] Foreign Application Priority Data
Feb. 4, 1972 France .............................. 72.05078

[52] U.S. Cl. ............................ 210/242, 210/DIG. 21
[51] Int. Cl. ............................................ E02b 15/04
[58] Field of Search ................ 210/DIG. 21, 83, 242

[56] References Cited
UNITED STATES PATENTS

| 3,630,376 | 12/1971 | Price | 210/242 |
|---|---|---|---|
| 3,664,505 | 5/1972 | Brittingham | 210/242 |
| 3,578,171 | 5/1971 | Usher | 210/DIG. 21 |
| 3,715,034 | 2/1973 | Ivanoff | 210/DIG. 21 |
| 3,737,040 | 6/1973 | Brydey et al. | 210/DIG. 21 |

*Primary Examiner*—Theodore A. Granger
*Attorney, Agent, or Firm*—Raymond A. Robic

[57] ABSTRACT

The disclosure relates to a device for collecting hydrocarbons, granular materials, absorbing bodies and various polluting agent which float as a layer on the surface of water such as sea, lakes, rivers, harbours, estuaries, pools, etc. The device operates by producing a sufficiently thick layer of polluting material so that it can be collected. It comprises a scoop having substantially the shape of a circular sector and a header with diffusing tubes circulating water under pressure towards the rear of the scoop where it is allowed to escape through a suitable opening. The thickened layer of polluted material which floats on top of water is removed through a separate duct.

3 Claims, 2 Drawing Figures

SCOOP FOR COLLECTING A LAYER OF POLLUTING MATERIAL ON WATER SURFACES

This invention relates to a scoop for collecting a layer of polluting material on water surfaces.

The gathering of floating debris at the surface of the sea is a problem which cannot be solved in a simple manner especially in the case of hydrocarbons, chemical products or absorbing bodies. These elements lead to another form of pollution as a result of their scattering on water surface so that they can only be gathered and picked up with great difficulty.

U.S. application Ser. No. 62,568, filed Aug. 10, 1970 in the name of Lucien Chastan-Bagnis, now U.S. Pat. No. 3,695,441, describes a self-propelled floating dock and separator assembly which can be used for the removal from the surface of water, of floating bodies having a consistency which makes them substantially indeformable.

The device according to the invention described in the above identified application consists of a floating dock which can be immersed at a predetermined depth, said device opening at its front end by means of a door which is horizontally articulated at its lower portion in order to form a kind of scoop. The device also comprises a closed inverted tunnel which extends from the front to the rear, at the bottom of the device and which is adapted to receive a helix which operates through a motor. The helix is devised for sucking the polluted water from the front to the rear through a filter in such a manner that the water which is rejected at the rear of the dock causes the device to move forward. The floating debris are therefor collected at the front portion of the dock but the free hydrocarbons cannot be retained, pumped or even surrounded by the floating dock because of the extreme rapidity of expansion of the layer of hydrocarbons and the like floating bodies on the water surface.

It is an object of the present invention to provide an accessory which can be adapted to the front portion of the dock to permit a pumping of the layer of hydrocarbons.

This apparatus is in the form of a scoop having the shape of a circular sector and is provided with a header for diffusing tubes, said header being parallel and above the frontal side of the scoop. Water which circulates under a selected pressure exits through the diffusing tubes and forms a series of jets which are directed towards the rear of the scoop where it can escape through an opening formed at the rear. If the scoop is arranged to have its bottom slightly below the layer of hydrocarbons which floats at the water surface, the laminar current which is produced by the diffusing tubes mounted at the front will carry the film of hydrocarbons towards the rear of the scoop and the thickness of the floating layer in the scoop will substantially increase thus permitting an easy pumping thereof without risking that an emulsion be formed. A stream of air, parallel to the surface of the floating hydrocarbon layer can be oriented to act from the front to the rear to substantially improve the formation of a thick layer.

Figure 2:
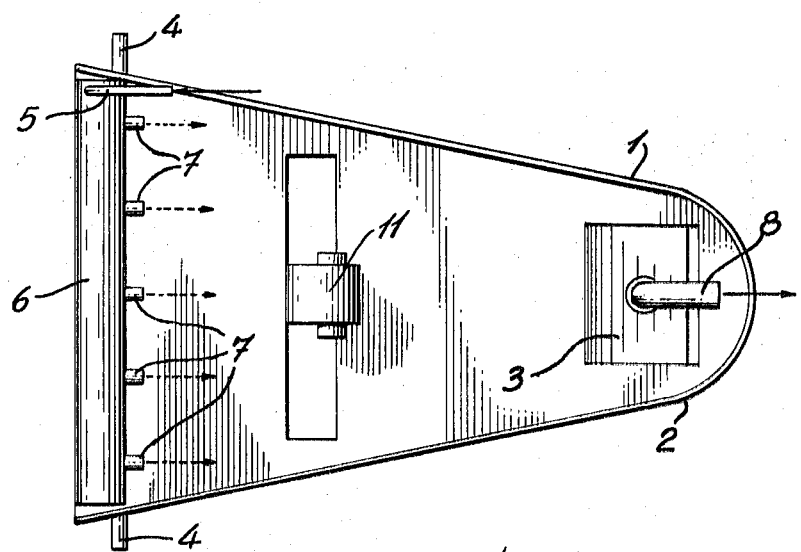

In the drawings which illustrate the invention,

FIG. 1 is a longitudinal vertical section of an apparatus according to the invention; and FIG. 2 is a plan view from above of the apparatus illustrated in FIG. 1.

The device illustrated is a scoop 1 having a bottom 2, a rear opening 3, and journals 4 to serve as fixation and articulation of the apparatus. Water is admitted at 5 in a header 6 which is provided with diffusing tubes 7 the latter being directed towards the rear of the scoop 1 to define so called hydroejectors. Pumping of the hydrocarbons is carried out above the opening provided for the removal water, by means of a tube 8. The layer of hydrocarbons is referred to by reference numeral 9 and water by reference numeral 10. Finally, the device comprises a blower 11 which creates a current of air at the water surface.

The operation of the apparatus is quite simple. After having immersed the scoop and its support at a suitable depth, the dock (not shown) is allowed to advance slowly and water is thereafter admitted under pressure in the duct 5 after which it escapes at 7 thereby causing a current which attracts a layer of water and the film of hydrocarbons floating thereon. Water escapes through the opening 3 and the hydrocarbons are accumulated at the rear of the scoop where they can easily be sucked by means of suction tube 8. It should be noted that the free surface of hydrocarbons in the scoop is at a higher level than the layer of water and that the current of air created by blower 11 which is directed from the front to the rear at the surface of the layer of hydrocarbons will help 9 to substantially increase this difference. The scoop can be an accessory of the floating dock or of any other machine capable of permitting its use. It could also be used alone or in a plurality in order to form a circular device to be used at the center of a surface which is affected by a polluting element in order to attack this element on a more important front.

The invention will serve to fight pollution, it will permit the cleaning of water surfaces which are polluted by hydrocarbons either at large or in the harbours or even in estuaries, in pools or in lakes.

I claim:

1. A device for collecting hydrocarbons, and other polluting agents floating on the surface of a body of water, comprising:
   a scoop member defining a compartment having a bottom wall, a rear wall, rearwardly converging side walls and an open front;
   a water discharge opening in said bottom wall adjacent said rear wall;
   means in said open front for directing jets of water rearwardly generally parallel to said bottom wall below but adjacent the surface of said body of water to thereby direct laminar flow of water and pollutants to the rear of said compartment whereby said pollutants accumulate in a thick layer adjacent said rear wall; and
   means on said device, adjacent the rear thereof, for removing pollutants from said thick layer.

2. A device as defined in claim 1 wherein said water discharge opening is provided with a baffle plate extending downwardly and rearwardly from its forward edge.

3. A device as defined in claim 1 including means for producing and directing a current of air rearwardly in said compartment along the upper surface of water and pollutants therein to help produce and maintain said thick layer of pollutants adjacent said rear wall.

* * * * *